Sept. 15, 1970     A. F. LEATHERMAN ET AL     3,528,867
METHOD FOR SELECTIVE HEAT SEALING OR JOINING OF MATERIALS
Filed Aug. 15, 1966                            2 Sheets-Sheet 2
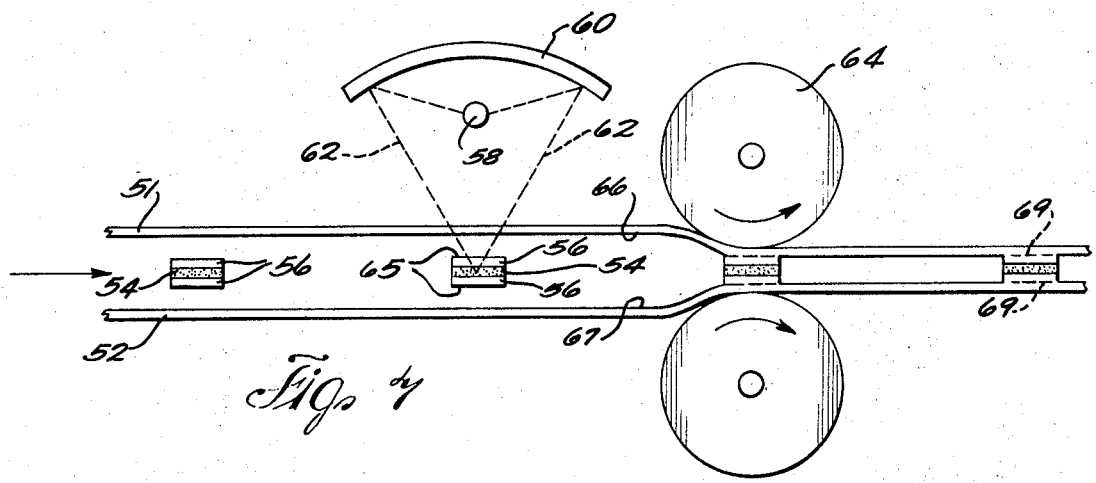
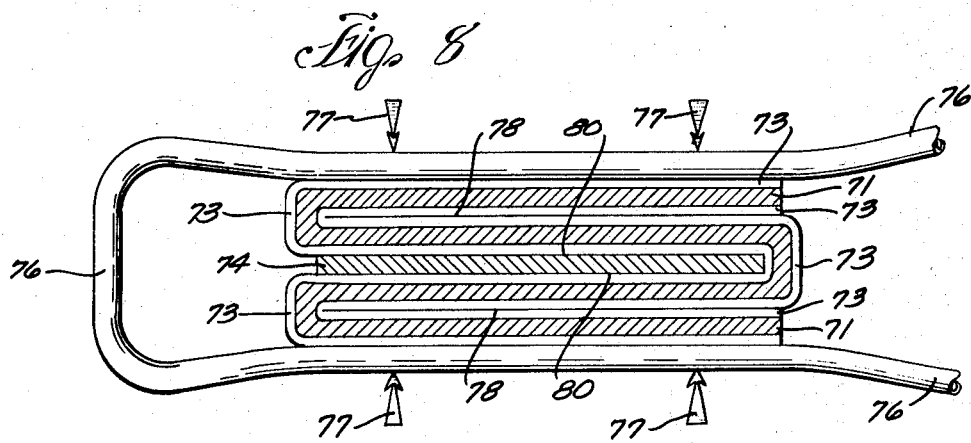
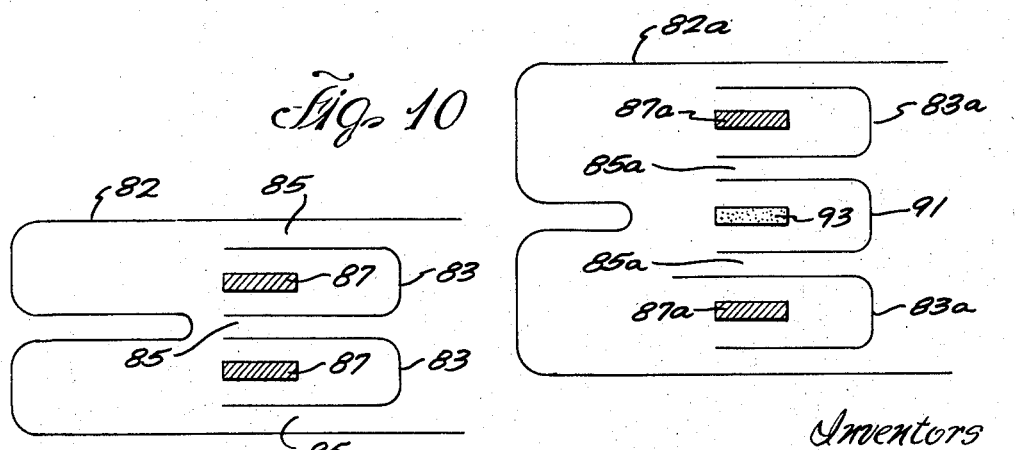
Inventors
A. F. Leatherman
W. C. Heller, Jr.
Lieben & Nilles
Attorney

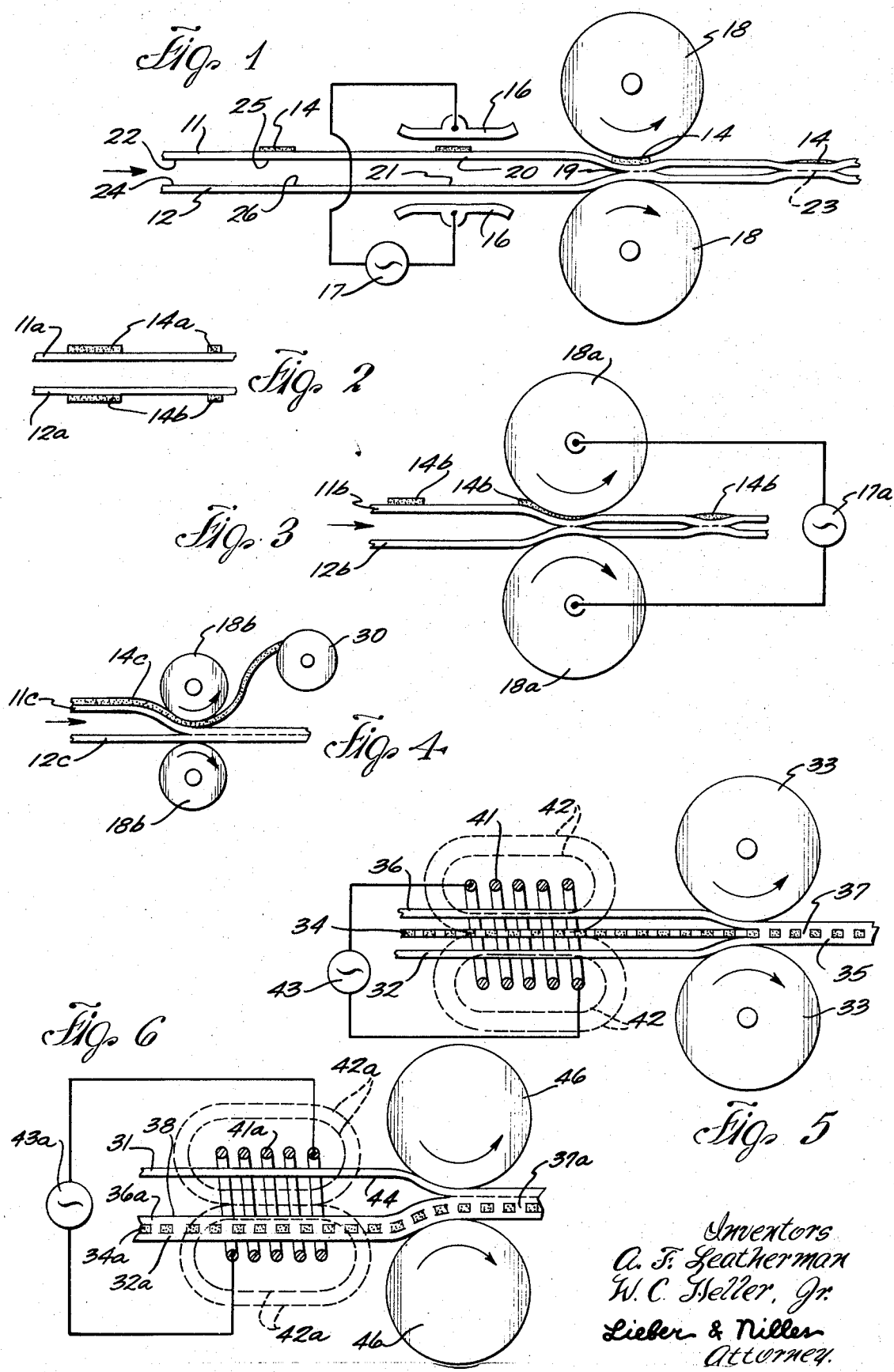

United States Patent Office

3,528,867
Patented Sept. 15, 1970

3,528,867
METHOD FOR SELECTIVE HEAT SEALING OR JOINING OF MATERIALS
Alfred F. Leatherman, Columbus, Ohio, and William C. Heller, Jr., 3521 N. Shepard Ave., Milwaukee, Wis. 53211; said Leatherman assignor to said Heller
Filed Aug. 15, 1966, Ser. No. 572,580
Int. Cl. B29c 19/02
U.S. Cl. 156—272     8 Claims

ABSTRACT OF THE DISCLOSURE

A method for selective heat sealing materials at predetermined interfacial surface areas comprises the steps of positioning the material surfaces in opposing abuttable relation, applying a susceptor material to a non-opposing surface of the material in registration with the predetermined interfacial areas, and inducing heat in the susceptor material to seal the opposing surfaces at the interfacial areas.

---

This invention relates, in general, to the art of joining of non-metals with the aid of heat, and relates especially to improved means by which a seal, bond, or joint can be obtained directly between the materials, such as thermoplastic films, being joined.

This invention permits bonding to be accomplished with or without an adhesive agent, on a continuous-process basis if desired, without the need for contact between the materials and the energy source, and with improved freedom in the size and shape of the seal. At the same time, in certain embodiments the method is used to prevent heat sealing at selected areas.

The method is applicable to joining of diverse covering materials in a variety of forms and dimensions, such as fabrics, sheets, films, webs, plates, bars, etc., with relative insensitivity to gage variation, and is applicable to materials varying in composition such as oriented or unoriented materials, joining dissimilar materials to one another, and to various processes such as preheating, melting, and laminating in addition to sealing of bags, carton liners, bag closures, carton overwraps, coated folding cartons, and the like.

One of the most common present practices for heat processing, such as the heat sealing of thermoplastic films, is to employ heated-element devices which are energized by electric self-resistance heating such as in the "impulse" type of sealer. Such equipment requires direct connection to a source of electrical energy. This requirement means that if continuous processing is required by this conventional method, it is necessary to mechanically translate the heating element in step with the work during sealing. This calls for complicated machinery, electrical slip rings, etc., to maintain the proper forces on the materials being sealed and to maintain electrical connection to the heating elements.

The method of the present invention permits the source of heating energy and applicators, etc., to remain stationary, if desired, while the work being heated or sealed can move smoothly in a continuous process. This is accomplished in some embodiments by means of heat-generating agents, referred to herein as susceptors, which are deposited, printed, extruded, laminated, doctored onto or otherwise made a part of the materials being sealed. The heat-generating agent, or susceptor, thus moves with the work during processing and creates the heat needed for sealing upon passing near an appropriate stationary source of energy such as an induction coil, pair of dielectric heating electrodes, microwave source, radiant or laser energy source, ultrasonic or electron beam, etc.

In other embodiments, the process is performed in a stationary arrangement or "batch" method, and in other forms the energy source can be moved while the materials being sealed remain stationary. Also, in general, the sealing material need not necessarily be preattached to the work but can be fed or wound into the process simultaneously as a filament or tape, etc., or can be dusted into place, metered on, printed on. In many cases, it is reasonable to reclaim the heat-generating material for re-use with economic advantages while the finished sealed product then does not contain the heat-generating material. In other cases, by leaving the heat-generating material in the product, at least temporarily, subsequent additional seals can be made in the same area thus making a package closure or adding new layers of material to the product, or the like.

The conventional heating element method of heat sealing also is restricted by the need to employ a heating element device having the same size and shape as the desired seal area, since all portions of the work exposed to the heating element normally become sealed. Furthermore, when it is necessary in the conventional method to change the shape of the sealed area, substantial, expensive, and time-consuming changes can be necessary in changing the heating element to a new shape to provide the new desired shape of sealed area.

The method of the present invention can employ application of the heat-generating agent only at the areas desired to be sealed. Since areas of the work are not provided with the heat-generating agent of the present method are affected very little or not at all in passing near the source of energy, the size and shape of the desired seal are readily predetermined by the susceptor material and the seal can be restricted only to the intended dimensions.

In certain processes, susceptor materials of certain types have heretofore been used to accomplish some advantages of the present invention such as continuous processing, no contact with the heat source, and predetermination of the sealed area. However, these past methods illustrate the use of the heat-generating agent directly at the interface being sealed. In attempting to practice these past methods some difficulty has been found in obtaining full seal strength when the composition of the heat-generating agent directly at the seal area is not optimum with respect to the composition of the materials being joined.

However, we have discovered that good heat transfer to the bond area can be obtained by locating the agent near but not at the bond area. When suitable pressure, etc., is then applied at these heated regions, direct bonding of one workpiece to another occurs, providing a superior direct seal. Thus, with the method of the present invention, optimum material preparations can be made in advance and the final seal, such as in closing a package at a packing plant, can be made between naturally matched surfaces. Also, in this same process, the composition of the heat-generating agent can be purposely selected to be incompatible with the materials to be sealed. In the latter case, it is found that although the heat-generating agent supplies enough heat to seal materials near it, the composition is such as to prevent sealing immediately to the heat-generating agent itself, thus providing sealed and unsealed areas at the same portion of a multilayered product.

Since the heat is generated at one surface of a material in the present invention while heat sealing is accomplished at a different surface, means are provided by which decoration, inked copy, or the like, can be applied to surfaces remote from the greatest source of heat so as to reduce or avoid possible degradation of such printed matter by the affects of elevated temperature.

In other types of heat-sealing processes used in the past, problems have been encountered, for example, in attempting to heat seal, by dielectric heating, plastic films directly. Several of the most popular films such as polyethylene, polystyrene, and polypropylene offer such low dielectric loss properties that indirect methods have been required, such as the use of lossy buffers as in U.S. Pat. No. 2,667,437 to Zoubek, which are themselves heated by the dielectric energy and which transfer this heat to the work essentially as in the common heating-element method. Since contact with the work is required, prior methods such as this can be highly restrictive in attempting to perform continuous sealing.

On the other hand, the methods of the present invention can provide an arrangement with a heat-generating agent that is selected to be receptive to dielectric heating and that can be a part of the work itself if desired, and move with it, thus eliminating a former problem of dielectric heat sealing in continuous processes.

In attempting to heat seal thermoplastic films by radiant energy such as infrared rays, it is found that many popular transparent or translucent films transmit the energy without sufficient absorption to produce the desired heating action. The present invention provides an arrangement with a heat-absorbent or heat-generating agent that is receptive to this type of energy, thus intercepting the rays and converting them to efficient heating action for use in sealing.

Therefore, it is an object of the present invention to provide a method of heating which permits a direct bond between the natural surfaces of the parent materials being sealed.

Another object is to provide means to avoid the heat sealing of one layer of material, for example, while producing a heat seal at a different layer at the same time.

A further object of the present invention is to provide means to circumvent the exposure of decorating inks and the like to maximum heat sealing temperatures.

It is a further object of this invention to provide a method of heat sealing which is useful with many different sources of energy and which voids the need for any direct contact between the energy source and the work, thereby permitting continuous motion of the work and avoiding intermittent stopping to make a seal, the method also being useful for noncontinuous or intermittent processing.

Yet another object is to provide a means whereby the area desired to be sealed can be restricted and predetermined prior to the sealing step and in which the area to be sealed is thus automatically limited even though the source of energy be applied to the entire body of the work in process, whereby a single energy applicator can be employed for making an unlimited variety of shapes and sizes of heat seals without changing the applicator.

In the drawings:

FIG. 1 is a fragmentary schematic view showing an embodiment of the invention for dielectric heat sealing of thermoplastic films;

FIG. 2 illustrates an alternative embodiment of a portion of FIG. 1;

FIG. 3 is a fragmentary schematic view showing the joint use of pressure rolls as electrodes;

FIG. 4 is a like view showing the collection of the susceptor material for re-use;

FIG. 5 is a fragmentary schematic view showing an arrangement of equipment using induction heating to prepare a multilayered sheet containing susceptor material;

FIG. 6 is a similar view showing an embodiment of the invention useful for joining of materials one or more of which normally are not heat sealable, such as paperboard stock;

FIG. 7 is a like view showing an arrangement in which radiant energy is used for joining materials which themselves have not been specially prepared in advance;

FIG. 8 is a sectional view of a stationary induction heat sealing arrangement in which heat sealing is avoided at one layer of an assembly of plastic-coated paperboard while being accomplished at two other layers;

FIG. 9 illustrates the accomplishment of three heat seals between plastic films while preventing heat sealing at two other areas of the assembly; and FIG. 10 illustrates a combination with the features of FIG. 9 but which permits an additional heat seal to be made without using additional susceptor material.

Referring to FIG. 1, two heat-sealable thermoplastic films 11 and 12 are shown being advanced from left to right and being heat sealed in a continuous process according to the present invention. In this case, the films could be, if desired, of the popular type such as polyethylene which have certain properties that create problems in several types of conventional heat sealing. Such problems stem from the transparent or translucent character of such materials, their low dielectric loss, very low electrical conductivity, and very low magnetic loss properties. These properties make it generally impractical to heat such films directly by means of radiant heating, dielectric heating, eddy-current induction heating or induction-hysteresis heating methods. Therefore, in the past, it has been common practice to heat seal such films by contact heat transfer methods using an external heat source such as the hot-wire impulse type. Such transfer sealing methods often result in difficulties in operation of a continuous process. Also, difficulties are encountered in control of heat transfer to the films often resulting in warping, sticking, wrinkling, charring, and the like.

At the left-hand region of FIG. 1, the film 11 has special auxiliary material 14 applied thereto or as a part of it. The auxiliary material 14 is selected to be energizable by an appropriate energy source so as to serve as a source of heat for heat sealing. The auxiliary material serving as a source of heat when energized, is referred to herein as a susceptor. The susceptor 14 has been applied to, or made a part of, the film 11, such as by various printing methods including offset, gravure, flexography, silk-screen, magnetic printing, xerography, or the like, or has been applied by other coating processes such as doctoring, laminating, extrusion, pneumatic, or electrostatic jet. It is not necessary for the susceptor 14 of FIG. 1 to be tightly adhered to the film 11 so long as it remains in position until after sealing is accomplished. Further, if desired, the application of the susceptor 14 to the film 11 could be accomplished conveniently as part of a continuous or discontinuous process such as already might be in use in an existing production line for the decorating, perforating, slitting, treating, rewinding, or folding of the film 11.

Although the susceptor material 14 is shown in FIG. 1 as having been applied only to one film member 11, it is understood that technically the purpose of the susceptor material is to generate sufficient heat to accomplish heat sealing. In some instances, therefore, especially when very high sealing speeds are desired, it may be necessary or desirable to employ susceptor material on both films, perhaps at opposite locations as shown in FIG. 2 for the susceptor material 14a, 14b and films 11a and 12a. It is also noted in FIG. 2 that the susceptor materials may have different sizes and shapes. Other means by which cost savings can be realized by reducing or altering the arrangement of the susceptor material will become evident to those skilled in the art. Methods for reclaiming the susceptor are considered below.

At a later station in the process in FIG. 1, the susceptor 14 passes between conventional dielectric heating electrodes 16, connected to a source of high-frequency voltage 17, which could be operating at one of the popular commercial frequencies such as 27.5 or 41 megacycles. In this case, the films 11 and 12, and susceptor 14 are shown not touching the electrodes 16, but it is understood that the invention may also be practiced with contact to the electrodes. Also, films 11 and 12 are shown with a parallel space between them. The size of the space shown in FIG. 1 is exaggerated for purposes of clarity. Normally the films 11 and 12 would be in contact with one another, or essentially so, before entering the active area between the electrodes 16, although this is not a requirement in embodiments of the invention in which the films are heated individually. The magnitude of the space present between the films 11 and 12 may be selected according to the preference of the operator or the preferred benefits found from experience with different conditions and materials. Further, the space in the direction of travel separating the heating and pressure stations is schematic, and may be increased or reduced or the heating and pressure may be combined into one step, such as will be described below.

In FIG. 1, it is intended that the susceptor 14 consist essentially of a composition that can be readily dielectrically heated. For example, halogenated polymers such as the polymers and copolymers of vinyl chloride, vinyl fluoride, vinylidene chloride, and vinylidene fluoride, and the polycarbonates, polyurethanes, polyacetales, and cellulose derivatives are among the materials suitable for this purpose. Certain liquids can also serve as the susceptor in some cases. Water is shown in use in a different process for heat sealing nylon by Yamaguchi in U.S. Pat. 2,992,958 dated July 18, 1961, and various liquids and other organic and inorganic materials are shown in a different process by Zucht in U.S. Pat. 2,859,153. While liquids can be used in the present process, the use of liquids to aid in the generation of heat is not preferred, first, because of the likelihood of vapors entering the bond area and interfering with the bonding process, secondly, because the liquids may vaporize and lose their effectiveness as heat-generating agents, and thirdly, to avoid mess and maintain cleanliness. Liquids could be of conceivable value if they could be isolated from the bond area as disclosed in the present invention by using them in a manner in which the film being sealed, such as the film 11 of FIG. 1, serves as a barrier between the liquid and the bond area. Further, any material that might poison or contaminate a product using the invention is undesirable.

As the susceptor 14 of FIG. 1 passes between the dielectric heating electrodes 16, the high-frequency electric field present generates heat in the susceptor 14. The films 11 and 12 may or may not be receptive themselves to dielectric heating. When such films are receptive, the susceptor 14 serves to enhance the heat generation and, in any case, helps to make it locally more pronounced in the region defined by the dimensions of the susceptor. As the susceptor 14 of FIG. 1 becomes heated, heat flows from it by nature into the portions of the film 11 adjacent to it, causing the film temperature at the area 20 (seen in edge view) of the surface 22 of the film 11 to increase to heat-sealing temperature. For example, a heat-sealing temperature of from 180° to 250° F. is preferred for various grades of polyethylene, while about 300° F. is preferable for polypropylene.

Simultaneously with the heating step, or immediately following it as shown in FIG. 1, the susceptor and films preferably are exposed to pressure such as by rolls 18, to promote heat sealing at 19, in a manner corresponding to the known benefits of pressure as used in other heat-sealing processes. If necessary, the rolls 18 may be treated by a release agent to prevent sticking, but generally, it will be found that if the temperature of the rolls is below the softening temperature of the films, sticking will not occur.

Inasmuch as the films 11 and 12 are relatively thin, heat not only transfers from the susceptor 14 to the area 20 of the lower surface 22 of the film 11 to be sealed, but also transfers to the area 21 of the upper surface 24 of the film 12, this surface being close to or in contact with the surface 22 during the process, particularly upon the application of pressure between the films 11 and 12 such as provided by the rolls 18. Thus, the necessary temperature needed for heat sealing is provided at the areas 20 and 21 of the films 11 and 12 which thus become bonded directly one to another as at 23, especially with the aid of the rolls 18 which cause areas 20 and 21 to become interfacial if they are not so prior to this point.

The resultant predetermined heat-sealed bond area 23 is a direct fusion weld between the films 11 and 12 offering the superior strength and durability of this type of bond. Furthermore, when the susceptor 14 is composed of a composition which becomes softened at elevated temperatures, the application of pressure to the combination of susceptor and films will cause a resultant flattening of these materials, when desired, by applying sufficient pressure to them. In cases where one film is thin and the other thick, it would be preferable to employ the susceptor on the thinner film but this is not a necessary restriction.

In another embodiment of the present invention, the electrodes 16 and the rolls 18 of FIG. 1 may be combined in joint function as shown in FIG. 3. In FIG. 3, the rolls 18a have been outfitted with electrically insulated axles and each roll has been connected electrically to a terminal of a high-frequency power supply 17a. Thus, the rolls 18a serve jointly as dielectric heating electrodes for heating the susceptor 14b and as means for applying pressure to the materials 11b, 12b being processed.

In a further embodiment of the present invention, shown in FIG. 4, the susceptor material 14c is being reclaimed by winding it out onto a collector drum 30. In this example, it is understood that the susceptor material 14c, shown for convenience as a continuous strip, is attached only temporarily to the film 11c such as by electrostatic forces, at a prior step in the process. Susceptor 14c is made of a composition that does not readily become heat sealed to the particular material of film 11c when heated, and which maintains sufficient mechanical strength at the necessary temperatures. Such a composition might contain a dielectrically lossy constituent combined into polytetrafluoroethylene as a carrier, for example. The rolls 18b of FIG. 4 are understood in this case to be connected to a source of energy, as was shown in FIG. 3, and to be provided with a release agent, if necessary, to prevent sticking of the susceptor 14c to the rolls 18b and drum 30. Thus, this embodiment permits the advantages of the invention to be realized while also providing for reclaiming of the susceptor for re-use. An extension of the arrangement of FIG. 4 could utilize the susceptor material in the form of a continuous belt.

The present invention offers particular advantages in sealing relatively thick materials that are not good conductors of heat, such as the popular plastic-coated paperboard stock used in milk cartons. The advantage is provided by the ability with the present invention to generate heat by means of susceptors located immediately adjacent to the area to be sealed even though several layers of various materials may separate the susceptor and the source of energy. Furthermore, FIGS. 5 and 6 will be employed to illustrate the preparation and use of a susceptor for induction heating to produce seals between paperboard materials in which the susceptor material is not present at the final sealed surface and, therefore, does not itself need to exhibit any adhesive action.

It should be understood that induction heating, wherever used in describing this invention, refers to eddy-current heating, magnetic hysteresis heating, or a combination thereof, as is generally recognized in the field.

In FIG. 5, a ply of paperboard 32, a ply of perforated susceptor material 34, and a ply of thermoplastic film 36 are shown being fed into a continuous process. The susceptor 34 is selected to be respective to induction heating and typically could consist of iron oxide particles in a polyethylene or nylon carrier or could be an electrically conductive foil. The materials pass through an induction coil 41 which is connected to a suitable power supply 43 so as to produce an alternating magnetic field 42 for induction heating purposes. The magnetic field is not affected by and does not itself affect the paperboard or thermoplastic, but it does generate heat in the susceptor material 34. The plies then pass through the pressure rolls 33. As noted with respect to FIG. 3, means are known by which the equipment of FIG. 5 could also be arranged for simultaneous induction heating and pressure application.

Although the three plies 32, 34, and 36 are shown in FIG. 5 as having parallel spaces between them as they pass through the induction coil, these spaces preferably are quite small and the plies will be seen to come into contact prior to passing through the rolls 33. Accordingly, it will be recognized that heat generated in the susceptor 34 will transfer in part to the adjacent plies. As this occurs, the thermoplastic 36 becomes sufficiently softened, such as would occur at a temperature of about 200° F. for medium-density polyethylene for example, so that when pressure is applied by the rolls 33, some of the thermoplastic 36 is forced to flow downward into the openings or perforations of the susceptor 34, forming protrusions 37 which, being soft, adhere to the fibrous upper surface 35 of the paperboard material 32. Although paperboard is a fibrous material which thus offers an irregular surface that will aid in this adhesion, it is understood that other materials are also useful in the practice of the invention and can be substituted for the paperboard.

Upon emerging from the rolls 33, the plies have become bonded together in this example by means of the tie action of the protrusions 37, resulting in a layered composite in which a thermoplastic coating is now present on the upper surface of the paperboard and a susceptor material is in place for subsequent use. It is understood that a variety of adhesive-type susceptor materials could be substituted for the particular susceptor material 34 of FIG. 5 which would provide direct and continuous adhesion between the plies and obviate the need for a perforated susceptor and the protrusions 37. The example shown in FIG. 5, however, eliminates the need for the susceptor 34 to have adhesion qualities. Besides the rolling method shown, the thermoplastic layer 36 could alternatively be applied to the susceptor and paperboard ply by extrusion, coating, laminating methods, or the like.

In FIG. 6, the material prepared in the process shown in FIG. 5 is being used to make a heat seal to another piece of paperboard 31, for example. If desired, the processes of FIGS. 5 and 6 can be combined.

In FIG. 6, the combination of paperboard 32a, susceptor 34a, and thermoplastic 36a, whether including perforations or not, provides a heat-sealable surface 38; and this combination is processed by exposing it to a source of suitable energy as by passing it through or into the high-frequency magnetic field of an induction heating coil such as the coil 41a of FIG. 6. As the materials enter the coil 41a, heat is generated in the susceptor 34a and some of the heat conducts through the thickness of the thermoplastic layer 36a, softening the upper surface 38 of the thermoplastic. Some of the heat at the surface 38 transfers to the lower surface 44 of paperboard 31, particularly when the materials enter the pressure rolls 46. When a temperature of about 180° to 240° F. is realized at the surface 38 of the thermoplastic layer, assuming it is polyethylene, pressure applied by the rolls 46 will produce bonding action between the thermoplastic 36a and the lower surface 44 of the paperboard 31, thus completing the heat seal. Other materials may be substituted for paperboard 31, or a composite could be substituted, such as represented by the combination of the paperboard 32a, susceptor 34a, and thermoplastic layer 36a, thereby resulting in a bond of one surface 38 to another such surface. Since the susceptor layers are both acting to produce softened surfaces 38 in such a process, increased sealing speed would be expected.

Clearly, the susceptor 34, 34a and thermoplastic 36, 36a of FIGS. 5 and 6 need not be provided in a continuous layer in the region between the plies 31 and 32, 32a, but may be arranged in an intermittent pattern whereby the shape and extent of the bonded regions will be restricted to a corresponding pattern when desired, since only the susceptor 34, 34a is directly receptive to the induction heat and not the plies 31 and 32, 32a, or the thermoplastic 36, 36a. Furthermore, although the arrangements of FIGS. 5 and 6 represent continuous moving processes, the invention also may be carried out by intermittent or batch-type procedures.

The embodiment of FIG. 6 provides a paperboard seal using a thermoplastic as the bonding material in a dry-heat-sealing procedure, without the use of liquids or sticky adhesives. In sealing heavy stock, particular advantages of speed and reduced heat damage are realized by the present invention in comparison to methods requiring application of heat from the outside, since the present invention produces the heating internally very close to the seal area and does not require heat transfer from the outside.

In FIG. 7, a source of radiant heat energizes the susceptor. Two plies of transparent or translucent film material 51 and 52 are shown, which are not necessarily thermoplastics, so long as the process will act to join them in the presence of heat. The films 51 and 52 are moving from left to right with a 3-ply sealing material disposed between them. The sealing material consists of a central susceptor layer 54 which generates heat when exposed to radiant energy, and two outer thermoplastic or heat-activated layers 56. The outer layers 56 are transparent or translucent to the infrared, or other form of radiant energy being used, as are the films 51 and 52. The 3-ply sealing material is prepared in advance by extrusion, laminating, coating, or any other suitable method. The 3-ply sealing material is shown as a discontinuous insert between the films 51 and 52 and may be held in place by the films 52 and 52, or by electrostatic attractive forces or the like. Alternatively, the sealing material may be present as a continuous strip or sheet. Also, as known in other art, the sealing material when applied as a continuous member in this and other embodiments, may be stretched by mechanical forces before or during application so as to achieve greater footage for a given spool weight, and to achieve flexibility of size and thickness as various sizes and thicknesses of materials to be sealed are substituted, and for various sizes of heat-seal areas.

The films 51 and 52 of FIG. 7 move to the right and the sealing materials 54 and 56 move in synchronism so that the materials become exposed to radiant energy from a source such as a lamp 58 and reflecting surface 60. The rays of radiant energy shown schematically at 62 are substantially transmitted through the transparent or translucent materials 51 and 56 so that they impinge upon the susceptor 54. The material of the susceptors 54 is selected from a large variety of materials known to become heated in the presence of radiant energy. When the radiant energy source is infrared, the susceptor may comprise carbon black or most any color of pigment or paint, plastic containing a pigment to make it substantially opaque, darkened metal, paper of most any color, etc. Under the influence of the incident radiant energy, the susceptor 54 becomes heated causing heat to be transferred to the adjacent thermoplastic or heat-sensitive members 56 and 56. When the heat-sealing temperature is achieved in these members, such as about 200° F. in the case of polyethylene, the presence of pressure such as provided by rolls 64, will then assist in completing the heat seal.

During the heating process of FIG. 7, the susceptor 54 transfers heat to the plies 56 and 56 which have heat-sealable surfaces 65. The surfaces 65 thus become heated, and since they are adjacent to or in contact with the surfaces 66 and 67 of the films 51 and 52, the surfaces 66 and 67 also become heated, particularly upon the application of pressure such as by the rolls 64. Final heat-seal bonds thus result between the film 51 and the sealing material 56 and between the film 52 and the sealing material 56 as illustrated at 69. When the films 51 and 52 are of the same composition as the thermoplastic 56 as preferred, a direct-fusion bond is obtained.

The present invention is useful for accomplishing heat seals at one region of a multi-layered assembly of materials while preventing heat sealing at other layers of the same assembly at the same time. Referring to FIG. 8, a triple-folded piece of plastic-coated paperboard 71 is shown in which the plastic coating 73 has been applied previously to both sides of the paperboard by any suitable method. A piece of susceptor material 74 is shown positioned at the inner fold, the susceptor material being placed there at a convenient time during the folding process. The folded materials are shown enclosed and held in place by an induction heating coil 76, of which only a portion of one turn is shown. External force applied to the coil 76 in the direction of the arrows 77 serves to hold the materials in place and to apply pressure during processing. The susceptor material 74 may, for example, be prepared by milling 30 percent by weight of iron oxide particles into nylon, so as to provide a composite that will be receptive to induction heating at frequencies on the order of 5 megacycles while not usually being readily heat sealable itself directly to polyethylene. The coating 73 in FIG. 8 is polyethylene.

Upon energizing the induction coil 76, heat is generated rapidly in the susceptor 74. The generated heat immediately begins to conduct into and through the multilayer assembly and acts to soften the polyethylene coatings 73. When the coatings 73 reach a temperature on the order of 200° F., heat sealing takes place at the interfaces 78. Upon deenergizing the coil and permitting the assembly to cool, it is found that although the interfaces 80 between the susceptor 74 and coatings 73 were above 200° F. in temperature during the process, these interfaces may be opened by the application of moderate force to the assembly and the susceptor 74 can be removed for reuse if desired. The use of nylon or another material not readily heat sealable at these temperatures with polyethylene as the carrier of the susceptor, thus provides a heat source that in itself prevents heat sealing at one predetermined area while causing it to occur at another. Besides preventing heat sealing by selection of the carrier of the susceptor material, a carrier material similar to that being heat sealed can be used and sealing to it avoided if high particle loading such as 100 or 200 parts by weight are employed instead. The principle employed in FIG. 8 has important applications, for example, in the field of milk cartons and other packages in which certain opening properties are necessary.

An additional example of the dual ability of the present invention to both promote and prevent heat sealing simultaneously is discussed in reference to FIG. 9. In this case, a possible application of interest could be a filling spout for a package of some type in which the same or different gages in the thickness of plastic film comprise the spout and the bag, for example. The present invention permits the several layers of plastic to be heated at once with heat seals obtained only at some of the layers, so that in one step several coincident seals are made in an economical selective procedure.

Referring to FIG. 9, a partially exploded edge view is presented of three pieces of plastic film to be heat sealed. The wall 82 of a heavy-gage plastic film bag (shown in part) is depicted schematically. Within the bag it is desired to attach two plastic film pieces 83 of lighter gage so that the pieces 83 become heat sealed to the bag and to one another at the three heat-sealed areas 85, but that no other heat-sealed areas occur. If a conventional external heat source is used and no special means are employed for preferential prevention of heat sealing, all six layers of film will become heat sealed together and the intended purpose of the product could not be realized.

By the methods of the present invention, however, two pieces 87 of susceptor material that is not readily heat sealable with the plastic films can be arranged as shown. Upon generation of heat in the susceptor pieces 87 as by one of the described methods, only the desired heat seals 85 are obtained and the susceptor pieces can be removed afterward if desired. The explanations in connection with FIG. 9 have been general and schematic since several of the methods discussed could be employed such as dielectric heating, induction heating, or radiant heating with appropriate susceptors as have been described, and, of course, pressure is applied where necessary.

The utilization of the materials of FIG. 9 to obtain an additional heat seal, and the use of a non-sealing non-susceptor, are illustrated in FIG. 10. In this example, a suitable material 93 is placed as shown within an additional fold of heat sealable material 91. The material 93 is selected to be non-heat-sealable to the material 91, and may be a non-susceptor, or a susceptor if desired. Upon energizing the susceptors 87a, heat conducts in part toward the material 93 passing through the layers of heat-sealable materials 83a and 91, so as to accomplish heat seals at both of the areas 85a. The concept of the use of a non-sealing non-susceptor is illustrated in FIG. 10 and it will be obvious to skilled persons that many other varieties of heat-sealing procedures can benefit from the use of this concept.

The figures illustrate the use of three different energy sources and several different arrangements of the susceptor material with respect to the materials being joined. It is to be understood that other combinations besides the exact ones shown are a part of the present invention. For example, the sandwich-type arrangement of the susceptor material of FIG. 7 could be modified by substitution of a susceptor receptive to induction heating instead of radiant heating, and the materials 51, 52, 54, and 56 could then be processed through an induction heating coil instead of a radiant energy source to accomplish heat sealing. In like manner, the susceptor design of FIG. 1 could be employed in an induction heating process, or in a radiant heating process, etc.

Furthermore, it is known that other energy sources such as ultrasonic energy beams, X-rays, lasers, ion beams, electron beams, nuclear radiation, can be used to generate heat in certain substances which in the spirit of the present invention can be termed susceptors and which can be arranged to practice heat sealing by the principles herein disclosed. The term "radiant heating" is here designated and defined as including such radiant energy sources in addition to infrared radiation. Furthermore, instead of the use of a thermoplastic surface to make the final bond, such as provided by material 36, 36a of FIGS. 5 and 6, the material 56 of FIG. 7, a "hot-melt" adhesive material or even a thermosetting material may be substituted to advantage in some cases. In addition, it may be found that the techniques of the present invention will offer special advantages when used in conjunction with certain other heat-sealing methods.

The fundamental principle of the invention, therefore, is the practice of using a heat-generating agent or susceptor of predetermined dimensions which has associated with it an available heat-sealable surface not containing the susceptor material, so that upon transfer of heat from the susceptor to the heat-sealable surface, a direct bond of predetermined dimensions of the available surface to another surface is realized, in which the bond interface being made contains no susceptor material thereby eliminating the need for the susceptor to provide adhesive action in making the final seal; and, as a component part of the method, heat sealing can be prevented at selected areas by appropriate selection of the susceptor composition when desired or by use of a non-adherent non-susceptor.

Various embodiments and features of the invention can be summarized as follows. The reference characters in the summary indicate generally the primary components shown in the drawings corresponding to the recited features, to facilitate understanding of the numbered claims at the end of this disclosure. The reference characters and the figures are used merely by way of example, however, and not in any limiting sense.

Therefore, in summary, referring to FIG. 1, a method is shown for joining predetermined interfacial areas 19 and 23 of adjacent heat-sealable surfaces 22 and 24 of covering materials 11 and 12, in which susceptor material 14, is provided within each predetermined area but spaced from the adjacent surfaces to be joined. The susceptor material for each predetermined area such as 19 and 23 has substantially the same size and shape as, and is in registration with, its respective corresponding predetermined area to be joined. In the operation of the method, then, heat is induced in the susceptor material to raise the temperature of its corresponding predetermined area, thereby to seal the adjacent surfaces of the covering material at this area.

As specifically shown in FIG. 2, the area 19 may differ in size and shape from another predetermined area 23 by varying the size and shape of the susceptor 14a, 14b. Also, it will be noted that the susceptor material is spaced from the adjacent surfaces of the materials to be joined by a distance at least as great as the thickness of the covering material.

FIG. 1 further illustrates an embodiment of the method wherein the susceptor material and one material 11 to be joined are in contact with one another and are moved together along a predetermined course. It is also evident in FIG. 1 that the susceptor material and one material 11 to be joined are in contact at that surface of the latter material 11 which is opposite the surface 22 thereof that is to be joined with an adjacent heat-sealable surface 24. Also, as discussed, the susceptor material may be either a solid or a liquid since the materials to be sealed separate the susceptor from the seal areas.

FIG. 1 also illustrates an embodiment wherein the heat is induced in the susceptor material 14a by dielectric heating, by means of electrodes 16 that are connected to and energized by the dielectric heating energy source 17.

In the embodiment illustrated in FIG. 6, the heat is induced in the susceptor material 34a by induction heating, by means of the induction coil 41a which is energized by the induction heating energy source 43a.

In the arrangement of FIG. 7, the heat is induced in the susceptor material 54 by radiant heating which, in this case, employs an electric lamp 58 operating with a reflector 60.

In FIG. 1, typical means are shown using the rolls 18 to apply pressure to a predetermined area 19 between the rolls while the area 19 is at elevated temperature.

As has been stated, the method is useful for sealing materials which are substantially unresponsive to the means such as induction heating or dielectric heating used to induce heat in the susceptor material.

In FIG. 6, and example of the method is shown in which the susceptor material 34a and the induction heating means 41a used to induce heat therein move relative to each other, although this is not a necessary restriction to the process.

Another typical feature of the invention is illustrated in FIG. 7, in which the radiant heating means 58 and 60 used to induce heat in the susceptor material 54 remains spaced from the susceptor material. In the same example, a useful feature is shown in which the means used to induce heat in the susceptor material remains spaced from the materials 51 and 52 to be joined. Yet another available feature shown in FIG. 7 concerns a case wherein the susceptor material 54 has been joined to the materials 56 and 56 that become joined to the materials 51 and 52.

In FIG. 4 an embodiment is shown in which the susceptor material 14c remains separable from the materials 11c and 12c that are joined.

In other variations of the process, such as shown in FIG. 8, at least one of the materials to be joined, represented in this case by the paperboard 71 having a coating 73, includes a portion, paperboard 71, that is not in itself heat sealable.

As illustrated in the moving processes of FIGS. 1, 6, and 7, for example, heat is induced in the susceptor material before the adjacent surfaces to be joined are placed in contact. On the other hand, the moving feature is not necessary as illustrated in FIG. 8, in which heat is induced in the susceptor material 74 while the adjacent surfaces to be joined as at 78 are already in contact.

An additional feature of the invention is that in many of the embodiments illustrated, the steps can be repeated so as to join additional material to the materials first joined.

In one of the alternative embodiments of the method, as shown in FIG. 10 for example, non-heat sealable material 93 is provided between those preselected areas of the material 91 adjacent to the non-heat-sealable material 93 so as to prevent the joining of these areas. By proper selection of the composition of the susceptor, the feature illustrated in FIGS. 9 and 10 may be employed in which the susceptor material itself is non-heat-sealable. In employing this feature, heat is induced in the susceptor material to raise the temperature of the adjacent materials for joining surfaces on the sides thereof opposite from the immediately adjacent areas heated by the susceptor.

In connection with the descriptive material for FIG. 8, certain advantages were noted from the arrangement in which some of the materials to be joined and some of the susceptor materials are arranged in a composite comprising more than three layers. Other advantages in this or other embodiments could include a reduced effect of heat on decorative or other types of coatings. Also, in connection with FIG. 8, it is noted that a layer of non-heat sealable material 71 is provided between the susceptor material 74 and the adjacent surfaces at 78 to be joined.

Various modes of carrying out the invention are contemplated as being within the scope of the following claims particularly pointing out and distinctly claiming the subject matter that is regarded as the invention:

What is claimed is:

1. A method of joining adjacent heat sealable surfaces of heat transferrable materials at predetermined discrete interfacial areas comprising the steps of:
    juxta-positioning the materials so that said heat sealable surfaces are adjacent but separated;
    applying a discontinuous susceptor material to a non-adjacent surface of one of the materials, said susceptor material being in registration with, and approximately the same size and shape as, the predetermined discrete interfacial areas;
    establishing a heating zone at a point removed from the point of application of the susceptor material suitable for inducing heat in the susceptor material; and
    moving said materials along a straight line of travel extending from the susceptor application point into the heating zone so that said susceptor material is carried by said one of said materials into the heating zone for heating one of said heat sealable surfaces; and
    thereafter applying pressure to said materials at a point in the straight line of travel beyond the heating zone to bring the adjacent heat sealable surfaces into abutment to heat the other of said surfaces and seal said surfaces in the predetermined areas.

2. A method as in claim 1, wherein the discontinuous susceptor material is a solid.

3. A method as in claim 1, wherein the discontinuous susceptor material is a liquid.

4. A method as in claim 1, wherein the means used to induce heat in the susceptor material in the heating zone remains spaced from the susceptor material.

5. A method as in claim 1, wherein the susceptor material is additionally joined to the materials that are joined.

6. A method as in claim 1, wherein at least one of the materials to be joined includes a portion that is not heat sealable.

7. A method as in claim 1, wherein the said predetermined areas to be joined are of different and varying configurations.

8. A method as in claim 1, wherein non-heat-sealable material is provided between preselected areas of adjacent surfaces to prevent the joining of said areas.

References Cited

UNITED STATES PATENTS

| | | | |
|---|---|---|---|
| 2,397,471 | 4/1946 | Cox | 156—272 |
| 2,640,796 | 6/1953 | Langer | 156—274 |
| 3,247,041 | 4/1966 | Henderson | 156—272 |
| 3,383,265 | 5/1968 | Garabedian | 156—272 |
| 3,384,526 | 5/1968 | Abramson et al. | 156—499 |
| 2,622,053 | 12/1952 | Clowe et al. | 156—272 |
| 3,018,881 | 1/1962 | Wall | 156—272 |

DOUGLAS J. DRUMMOND, Primary Examiner